June 21, 1938.  J. STANITZ  2,121,672
METHOD OF MAKING SINKS
Filed June 29, 1936   3 Sheets-Sheet 1

Inventor
Jacques Stanitz
By Frease and Bishop
Attorneys

Inventor
Jacques Stanitz

June 21, 1938.  J. STANITZ  2,121,672
METHOD OF MAKING SINKS
Filed June 29, 1936  3 Sheets-Sheet 3

Inventor
Jacques Stanitz
By Frease and Bishop
Attorneys

Patented June 21, 1938

2,121,672

UNITED STATES PATENT OFFICE 2,121,672

METHOD OF MAKING SINKS

Jacques Stanitz, Warren, Ohio, assignor, by mesne assignments, to Mullins Manufacturing Corporation, Salem, Ohio, a corporation of New York Application June 29, 1936, Serial No. 87,846

13 Claims. (Cl. 113—120)

The invention relates to sinks, wash basins and the like, formed from sheet or plate metal, and more particularly to the manufacture of such a product from a single sheet metal blank by stamping or drawing operations.

Such a sink product includes a fluid receiving bowl and in some cases one or more drain boards and the bowl and drain boards terminate on three sides thereof in a rolled or turned rim formed as a part of a depending flange, and the fourth side thereof terminates in an upright back wall or splash back rearwardly flanged to form a continuation of the depending rim flange.

Such sink products are usually manufactured from steel and covered with a protective coating such as a vitreous enamel coating, and the present invention is of particular importance with respect to enamel coated sinks because no welding operations are performed during the manufacture of the sink, which if present, would cause difficulties in providing a satisfactory enamel coating. However the invention is not limited to the manufacture of enamel coated sinks because sink products may be made in accordance with the present invention from non-ferrous metals, stainless steel, Monel metal or the like.

Sink products have been made from single sheet metal blanks, for instance as shown in the Corrigan Patent No. 1,635,311 and in the Stanitz Patent No. 1,916,910. However sinks made in accordance with either of these patents require welding operations to be performed.

Sinks have also been made from single sheet metal blanks without requiring any welding operations to be performed in connection with the formation of the turned rim, and the flange thereof which is continuous with a splash back flange.

However the latter method of making such sinks is quite complex and involves a large number of special operations substantially all of which utilize complicated dies and require complicated press operations. Also, these operations are accompanied by considerable handling and turning of the sink product during the various stages of its manufacture.

Accordingly it is a principal object of the present invention to provide an improved method of making sink products which overcomes the difficulties and eliminates many of the expensive and complicated operations involved in prior practice.

Furthermore it is an object of the present invention to provide for the simplified manufacture of a sink product from a single sheet metal blank in which a fluid receiving bowl, together in some cases with one or more drain boards, terminates in a rolled or turned rim and in a comparatively high back wall or splash back; and in which the rim and splash back are each provided with a flange which extends integrally and coextensively around three sides of the bowl, and drain boards when present, and also around the ends and top of the splash back.

In addition, it is an object of the present invention to provide for the simplified manufacture of a sink of the type just described in which the advantageous stiffening ledge construction shown in my copending application Serial No. 678,823 (Patent No. 2,045,969) may be incorporated, without preventing the improved simplified manufacturing operations from being carried out.

Moreover, it is an object of the present invention to provide certain operations in the manufacture of a sink of the type described which enable the entire manufacture of sink product to be simplified; and which at the same time provide for the strengthening and stiffening of the resulting sink product between the table or generally horizontally extending portions thereof and the upright splash back or generally vertically extending portions thereof.

Moreover, it is an object of the present invention to provide for the simplified manufacture of a sink of the type described without any welding; which sink may be readily coated with a preferably acid resisting enamel coating of high quality, so that the resulting coating is uniform in appearance and characteristics and is free from flaws which result if welded areas are present in the sheet metal base.

And finally, it is an object of the present invention to provide an improved sink or wash basin product of the foregoing character formed from a single blank of sheet metal without welds, which is very light in weight, which is inexpensive to manufacture, which has a pleasing and attractive appearance, which is very stiff and rigid, and which may be provided with a vitreous enamel coating free from defects.

These and other objects and advantages apparent to those skilled in the art from the following description and claims may be obtained by the sink product construction hereinafter described in detail and claimed, a preferred embodiment of which is shown in the accompanying drawings.

The foregoing objects and advantages are also obtained by the methods, method steps and operations of making such sink products hereinafter set forth in detail and claimed, preferred steps of which are shown in the accompanying drawings, and which may be stated in general terms as including drawing a single metal blank to form a bowl or basin with adjacent areas for drain board, splash back, and rim portions; drawing drain board and splash back portions adjacent to the bowl with a surrounding raised turned rim formed as a part of a depending flange, providing excess metal adjacent to the places in the rim where the splash back will extend upwardly from the bowl and drain board portions by drawing inverted V-shaped trough-like projections adjacent to said places in said rim, with the trough bottoms in the plane of the rim; trimming excess metal from the edge of the depending flange and from portions of said trough-like projections; bending the splash back and its flanged rim portions upwardly to extend generally vertically at right angles to the remaining generally horizontally extending bowl, drain board and flanged rim portions, on a line passing through the apices of said V-shaped trough portions and lying preferably substantially in the plane of the rim thereby leaving substantially flat angularly disposed ears adjacent to the bend in the raised turned rim; bending said ears to a position coplanar with the rearwardly extending end flanges of the splash back rim and the depending or apron end flanges of the rim surrounding the bowl and drain boards; and then forming inturned flanges on said apron and splash back flanges.

Figure 12:
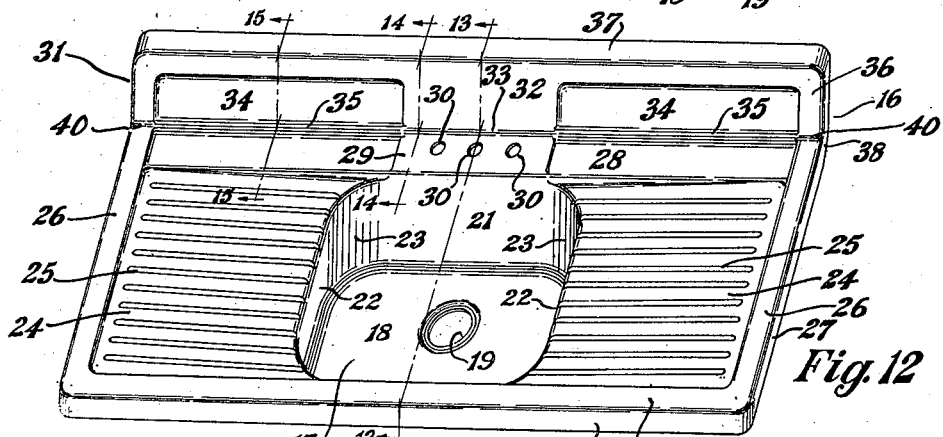
Fig. 12 is a perspective view of the completed sink.
Figures 14, 15:
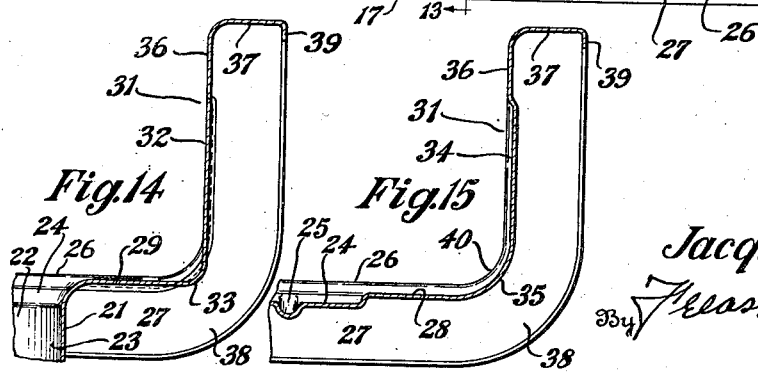

Fig. 14 and 15 are enlarged fragmentary sections taken on the lines 14—14, and 15—15, respectively, in Fig. 12.

Similar numerals refer to similar parts throughout the various figures of the drawings.

Referring first to Figs. 12, 13, 14 and 15, the improved sink product is generally indicated at 16 and may include a fluid receiving bowl 17, having a bottom wall 18 provided with a drain opening 19, and having substantially upright or vertical walls, preferably substantially rectangular in cross section and including a front wall 20, a rear wall 21 and side walls 22, with preferably rounded corner walls 23 therebetween.

A drain board 24 is preferably provided at each side of the bowl 17, and each drain board 24 preferably has a multiplicity of drain grooves 25. The drain boards 24 each preferably slope downward toward the fluid receiving bowl 17, as best shown in Fig. 12.

The bowl 17 and drain boards 24 are preferably surrounded on three sides by and terminate in a preferably continuous rolled or turned raised rim 26, which is formed integrally as a part of the depending apron flange or skirt 27. A ledge 28 is preferably formed at the rear of the bowl 17 and the drain boards 24, which ledge 28 may be located slightly below the plane of the upper surface of the rolled or turned rim 26 and slightly above the highest point in the sloping plane of the drain boards 24, as well shown in Figs. 12 and 15. If desired, the ledge 28 may be formed with a slightly raised center panel portion 29 (Fig. 14) in which a plurality of openings 30 may be formed for receiving faucet or other plumbing connections.

The raised panel 29 may either be in the plane of the raised rim 26, or may be located intermediate the plane of the raised rim 26 and the plane of the ledge 28, as shown. The parts thus far described may generally comprise the table or generally horizontally extending portions of the sink 16.

At the rear of the ledge 28, an upright splash back 31 extends preferably vertically upwardly and may comprise a central panel portion 32 generally corresponding to the panel portion 29 and merging therewith by the small radius curve 33 (Fig. 14), and also depressed or embossed panel portions 34 corresponding to the ledge 28 and merging therewith by the large radius curve 35 (Fig. 15); so as to form a splash back having a turned raised rim 36 formed as a part of a rearwardly extending flange 37 extending around the top and ends of the splash back 31. As shown, the panel 32 may be located in the plane of the splash back rim 36.

The rearwardly extending flange 37 formed around the top and ends of the splash back 31, is formed integrally as a part of the depending flange 27 surrounding the front and ends of the sink table portion and the flanges 27 and 37 are joined by rounded corners 38 therebetween. The rounded corners 38, which are coextensive with and formed integrally as a part of the flanges 27 and 37, are provided by the improved method of manufacturing the sink hereinafter described in detail.

The flanges 27 and 37 and corners 38 are preferably provided with a short inturned flange 39; and corner bends 40 occur between the raised turned rims 26 and 36, preferably substantially concentric with the curve 35 (Fig. 15) extending between the splash back panels 34 and the ledge 28.

It is to be understood that the panels 32 and 29 need not necessarily be provided so as to be raised above the panels 34 and ledge 28, respectively, but may be coextensive with the same; because the panels 29 and 32 are provided more for appearance's sake than for any structural reason.

The sink 16 is in its entirety made from a single sheet or blank of metal, preferably steel, and is made without any slitting, welding or notching so that it may be readily coated with a vitreous enamel coating. The method of making sinks set forth in my prior Patent No. 1,916,910 may be utilized in the manufacture of the sink 16; and likewise the structural features claimed in my copending application, Serial No. 678,823 (Patent No. 2,045,969) may be incorporated in the construction of the sink 16.

Although a double drain board type sink 16 is shown in Fig. 12, it is to be understood that the features of the improved sink construction may be incorporated in a single drain board type sink, or in a simple basin type sink.

The manufacture of the novel improved sink 16 may be carried out in accordance with the improved method as follows:—

Figure 1:
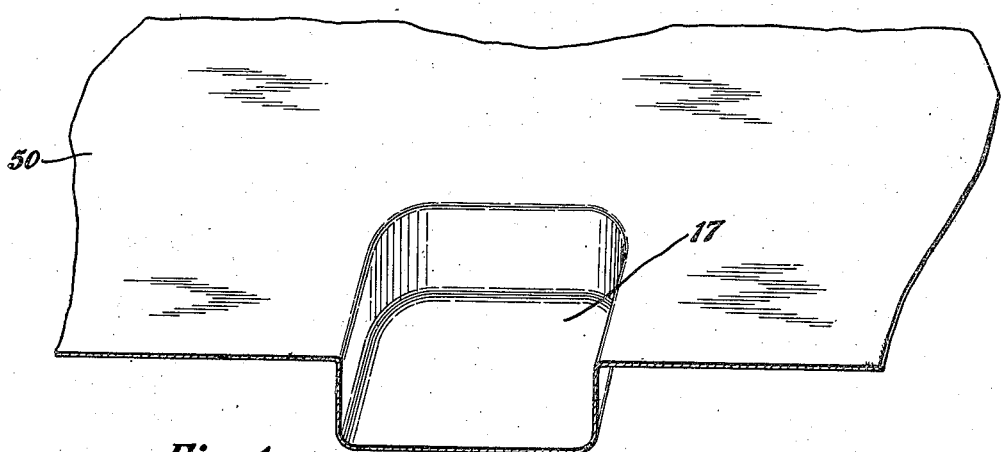
Fig. 1 is a fragmentary perspective view, partly in section, showing a single sheet metal blank from which the sink is made and showing the first bowl forming operation.

A suitably shaped blank of sheet metal 50 (Fig. 1) is introduced between suitably shaped draw dies to draw the sink fluid receiving bowl 17 therein. The blank 50 with the bowl 17 drawn therein is then formed by a succeeding operation in suitably shaped draw dies to the shape indicated generally at 50a in Figs. 2, 3 and 4. In the blank 50a, the drain boards 24, the drain grooves 25, the turned rim 26 and its depending flange 27, the ledge 28 and its center panel portion 29, the splash back 31 including its panel portions 32 and 34 and the rim 36 flanged at 37, are all formed to substantially their finished shape, although not their finished location.

In the blank 50a, the sink table portion including the bowl 17, drain boards 25, ledge 28 and the surrounding flanged rim 26 are generally in a horizontal location, as is also the splash back portion 31 and its corresponding parts. The splash back 31 will later extend in a generally upright or vertical position at right angles to the horizontal or table portion of the sink.

The top surfaces of the raised rims 26 and 36 are in the same horizontal plane; and the flanges 27 and 37, respectively, of the rims 26 and 36 extend downwardly from the rim portions 26 and 36 an equal distance. Inverted V-shaped troughs 51 are formed in the blank 50a extending outwardly from the flanges 27 and 37 adjacent the places where corners will be formed between the rims 26 and 36 when bending the splash back 31 to an upright position.

The apices 52 of the V-troughs 51 lie preferably substantially in the plane of the upper surface of the rims 26 and 36 and extend outwardly therefrom generally in a line along which the bend will later occur, which bend line may be assumed to be the section line 3—3, Fig. 2. The side walls or wings 53 of each V-trough 51 are substantially at right angles to each other (Figs. 2 and 4) and are preferably each located in planes extending at 45 degree angles below the plane of the rims 26 and 36; and the intersection of the wings 53 coincides with the bend line.

Figure 3:
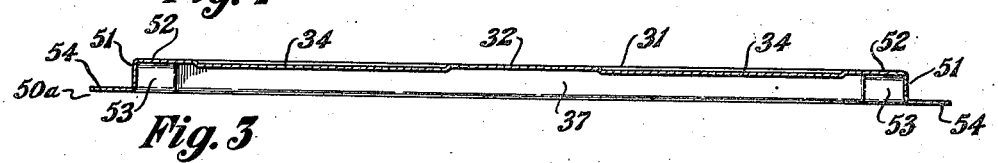
Fig. 3 is a section taken on the line 3—3, of Fig. 2.
Figure 2:
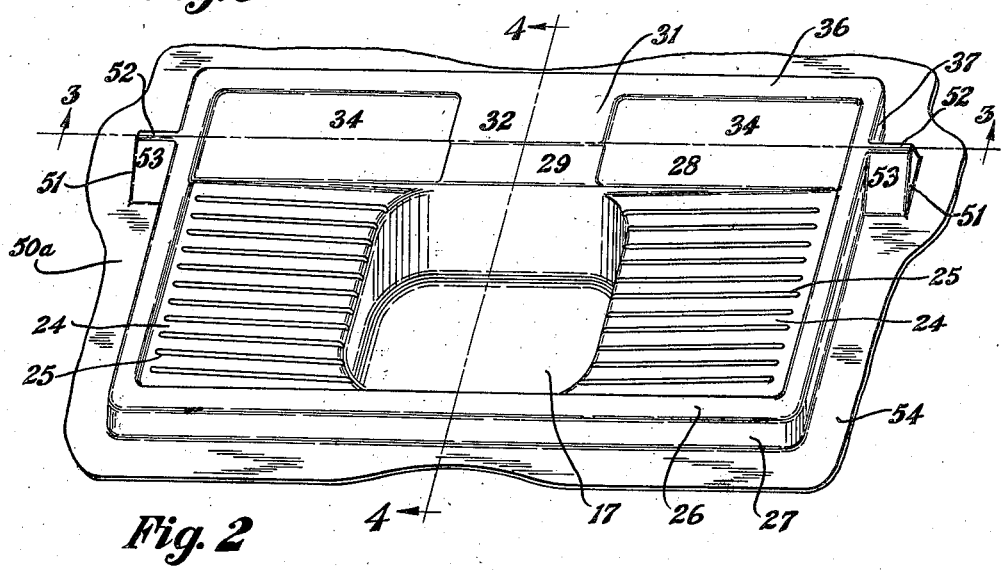
Fig. 2 is a similar view showing a succeeding operation for forming drain boards, a ledge, a splash back portion, a surrounding raised turned rim formed as a part of a depending flange, and inverted V-shaped trough portions adjacent to the place in the rim where the splash back will be bent upwardly.
Figure 4:
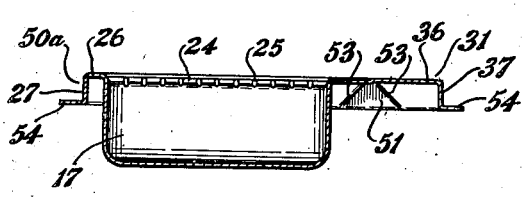
Fig. 4 is a section taken on the line 4—4, Fig. 2.

A flash 54 extends outwardly from the lower edges of the flanges 27 and 37 and the troughs 51, as well shown in Figs. 2, 3 and 4.

Figure 5:
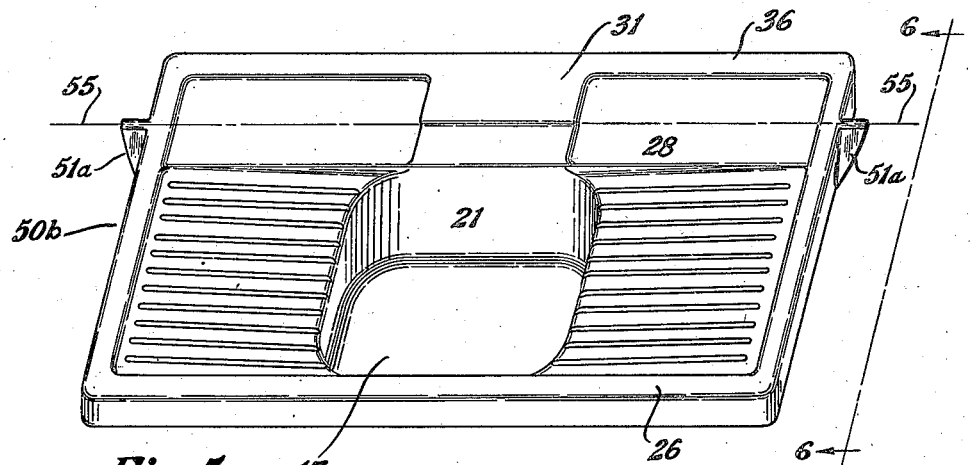
Fig. 5 is a view similar to Figs. 1 and 2 illustrating a succeeding trimming step.
Figure 6:
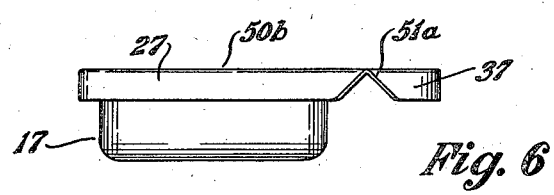
Fig. 6 is an end view looking in the direction of the arrows 6—6, Fig. 5.

In the next operation, the blank 50a is trimmed to have the shape shown at 50b in Figs. 5 and 6 by removing the flash 54. This trimming operation also removes portions of the wings of the V-troughs 51 so that they have an ear shape substantially as shown at 51a.

Figure 7:
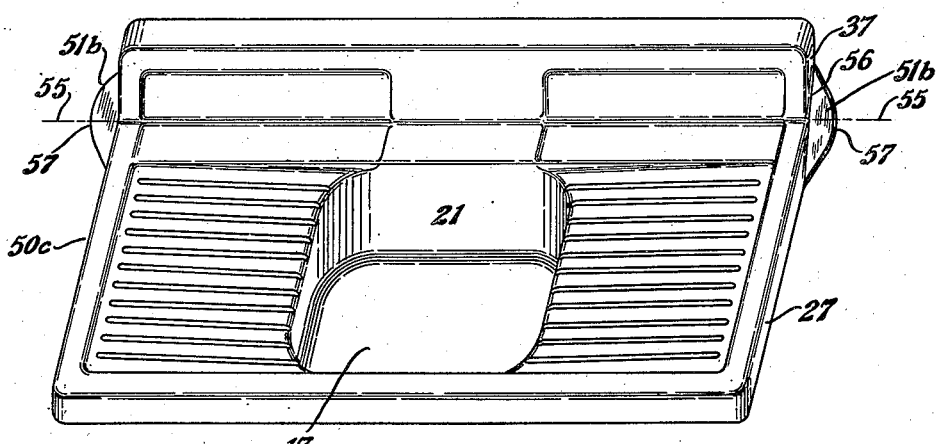
Fig. 7 is a perspective view similar to Figs. 1, 2 and 5, showing a succeeding bending operation in which the flanged splash back is bent upwardly along a line passing through the apices of the V-trough projections and the raised rim.

In the next operation, the splash back portion 31 is bent upwardly along a bending line indicated in dot-dash lines at 55 in Figs. 5 and 7; and the line 55 passes through the intersection of the ear shaped wings 51a, through the plane of the rims 26 and 36 and through the places of intersection between the ledge 28 and splash back 31. The bend line 55 also lies back of the plane of the rear wall 21 of the sink bowl 17. The bending is continued until the ear shaped wings 51a lying on the splash back panel side of the bending line lie in the same plane as the other ear shaped wings 51a of the troughs.

Figure 8:
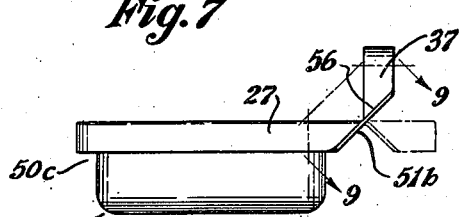
Fig. 8 is an end view of the partially completed sink shown in Fig. 7.
Figure 9:
Fig. 9 is a fragmentary sectional view taken on the line 9—9, Fig. 8.

The shape of the blank at this state in its manufacture is indicated generally at 50c in Figs. 7 and 8. The ear shaped wings 51a have now taken on the shape of ears as indicated at 51b; which ears 51b are substantially flat and lie in planes angularly disposed with respect to flanges 27 and 37. Each ear 51b intersects the flanges 27 and 37 along the line 56 (Fig. 8). The ears 51b have rounded corners 57 and the plane of the ears still lies substantially in the bend line 55.

Figure 10:
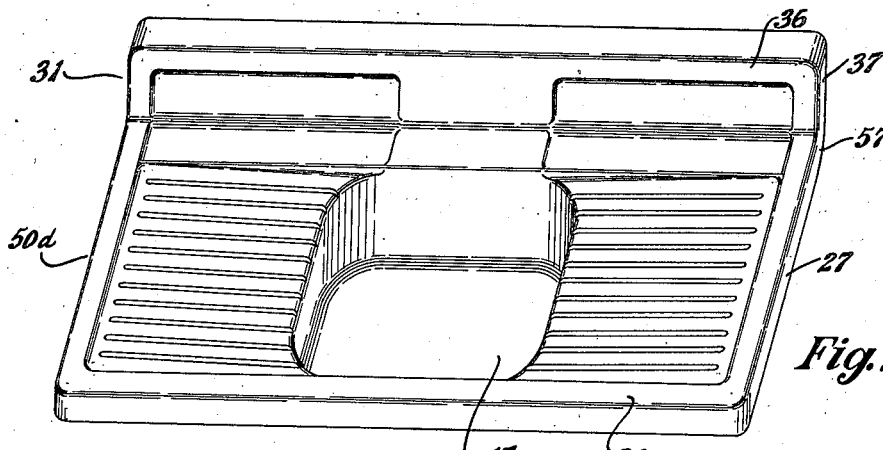
Fig. 10 is a perspective view similar to Figs. 1, 2, 5 and 7 showing a succeeding ear bending operation.
Figures 11, 13:
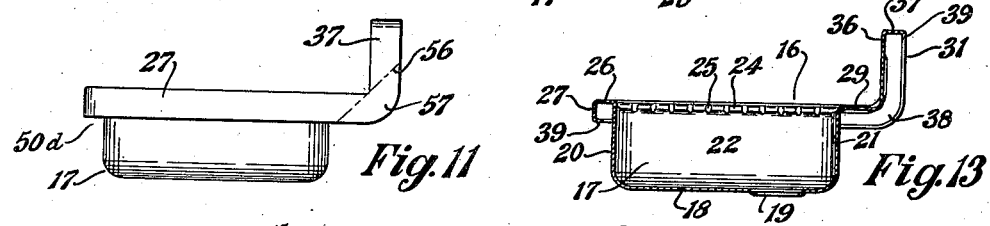
Fig. 11 is an end view of the substantially completed sink shown in Fig. 10.
Fig. 13 is a section looking in the direction of the arrows 13—13, Fig. 12.

In the next operation, each ear 51b is bent backward along the intersection line 56 to a position coplanar with and in continuation of the depending flange 27 and rearward flange 37, as best shown in Figs. 10 and 11. The substantially completed sink blank at this state in its manufacture is shown at 50d in Figs. 10 and 11 and the only remaining operations to complete the sink 16 are to form the inturned flanges 39 on the flanges 27 and 37 and ears 51b—57, which become the corners 38; and to form the drain opening 19 and the plumbing fixture openings 30.

Although a somewhat larger radius is shown at 40 in Figs. 14 and 15 than is shown in Figs. 7, 8, 11, and 12, the bending of the splash back 31 upwardly is always performed upon the definite bending line 55. The size of the radius 40 is a matter of choice, but there must always be a fillet of some size. A large radius or fillet may be provided for cleanliness and appearance. The rounding of the corner 40 may be accomplished by so shaping the die surfaces of the bending die, or may be accomplished by a subsequent operation.

In its broadest aspects, the invention which comprises the present improved method contemplates forming a table or bowl panel and a splash back panel surrounded by a continuous rim formed as a part of a downturned flange in a flat sheet blank on either side of a bending line, forming portions projecting laterally integrally from said rim and flange on and extending from the bending line, bending said splash back panel and parts of said projecting portions upwardly along said bending line to form said portions into laterally projecting flat ears, and bending said ears to a position coplanar with the bowl and splash back panel rim flanges.

Thus, the present invention provides an improved method and improved method steps for inexpensively making a light weight sheet metal sink from a single sheet or plate of metal free from welds, which may be enamel coated.

Accordingly, the present invention provides methods and means for overcoming the difficulties and eliminating many of the expensive and complicated operations involved in the prior practice of making sinks of the type described from sheet metal.

In the foregoing description, certain terms have been utilized for brevity, clearness and understanding; but no unnecessary limitations are to be implied therefrom beyond the requirements of the prior art; because such words are utilized for descriptive purposes herein and not for the purposes of limitation, and are intended to be broadly construed.

The word "sink" used herein and in the claims, is intended to include sinks, wash basins, wash bowls and the like, whether or not one or more drain boards are incorporated in the basin or bowl panel; the words "sheet metal" are intended to include sheet and plate metal of the desired or necessary gauge, including steel, stainless steel, Monel metal, or other metals from which it may be desired to construct sinks; the words "rolled rim" or "turned rim" are intended to describe the usual rim extremity of the bowl panel and splash back panel whether or not the same is raised in the splash back panel; the words "enamel coated" are intended to refer to and include coatings other than vitreous enamel coatings if desired; the words "bowl panel" and "splash back panel" are intended to include all of the structural elements included, respectively, in the generally horizontally and generally vertically extending portions of the sink; and the words "bending line" are intended to include the narrow band or zone, which may be curved to form fillets, at the corner or juncture between the various parts of the bowl panel and splash back panel.

I claim:

1. In the method of forming a sink from a single metal blank drawn flatwise to provide a bowl panel and a splash back panel terminating in a rim having a downwardly extending flange continuously around said panels, the steps of drawing trough-like lateral projections in said flange at opposite sides of the blank having wings intersecting on a line upon which the splash back panel is to be bent upwardly, and then trimming excess metal from said continuous flange and projections.

2. In the method of forming a sink from a single metal blank drawn flatwise to provide a bowl panel and a splash back panel terminating in a rim having a downwardly extending flange continuously around said panels, the steps of drawing projections in said flange having intersecting wings extending outwardly at opposite sides of said panel, bending the splash back upwardly along a line passing through said wing intersections to form flat ears, and bending said ears to positions coplanar with the upwardly bent splash back panel flange and the downwardly extending bowl panel flange.

3. In a method of making a sink from a single metal blank, the steps of providing a bowl panel and an adjacent splash back panel flatwise in said blank by a drawing operation, said drawing operation terminating said panels in a rim having a continuous downturned flange, and said drawing operation also forming projections in said flange extending outwardly at opposite sides of said panels, each projection having portions extending angularly with respect to each other and intersecting on a line and also extending laterly from the continuous flange with which they are joined; and then reforming said drawn blank by bending operations, one of which is on said line to locate the splash back panel substantially at right angles to said bowl panel and to locate said projection portions in positions coplanar with the continuous bowl and splash back panel flange.

4. In a method of making a sink from a single metal blank, the steps of providing a bowl panel and an adjacent splash back panel flatwise in said blank by a drawing operation, said drawing operation terminating said panels in a rim having a continuous downturned flange, and said drawing operation also forming projections in said flange extending outwardly at opposite sides of said panels, each projection having portions extending angularly with respect to each other and intersecting on a line and also extending laterally from the continuous flange with which they are joined; trimming excess metal from said continuous flange and projections; and then reforming said drawn blank by bending operations one of which is on said line to locate the splash back panel substantially at right angles to said bowl panel and to locate said projection portions in positions coplanar with the continuous bowl and splash back panel flange.

5. The method of making a sink from a single metal blank, which includes forming a bowl panel and a splash back panel surrounded by a continuous flanged rim in a flat metal blank on either side of a bending line, forming trough portions projecting laterally integrally from said flanged rim and having wings the intersection of which coincides with said bending line, bending said splash back panel upwardly along said bending line until the wings of the trough lying on the splash back panel side of the bending line lie in the same plane as the opposite wings to form ears, and bending said ears about the lines of their intersection with the flanged rim to positions coplanar with the bowl and splash back panel rim flanges.

6. The method of making a sink from a single metal blank, which includes forming a bowl panel and a splash back panel surrounded by a continuous flanged rim in a flat metal blank on either side of a bending line, forming V-shaped portions including wings projecting laterally integrally from said flanged rim lying in planes which coincide with and extend angularly from said bending line, bending said splash back panel and wings extending therefrom upwardly along said bending line to form said wings into flat ears, and bending each ear at its intersection with the flanged rim into the plane of the bowl and splash back panel rim flanges.

7. The method of making a sink from a single metal blank, which includes forming in a flat metal blank a bowl panel and a splash back panel surrounded by a continuous raised rim terminating in a depending flange with the bowl panel and splash back panel located on opposite sides of a bending line, providing wing portions extending angularly from said flange and intersecting in said bending line at each side of said formed blank, bending said splash back panel and wing portions thereof upwardly along said bending line to form flat ears projecting angularly from said flange, and bending said ears about the lines of their intersection with said flange to positions coplanar therewith.

8. The method of making a sink from a single metal blank by drawing and bending operations, which includes drawing a bowl, ledge and drain board containing panel in a flat metal blank on one side of a bending line; at the same time drawing a splash back panel on the other side of said bending line; and at the same time forming a continuous rim surrounding said panels, drawing a flange downward from said rim and drawing troughs having portions intersecting along said bending line extending laterally integrally from said flanged rim; bending said splash back panel along the bending line to an upright position substantially at right angles with the bowl panel thereby forming said trough portions into flat ears; and bending said ears about the lines of their intersection with said flanged rim to positions coplanar with the bowl and splash back panel rim flanges.

9. In a method of making a sheet metal sink having a bowl panel terminating on three sides in a flanged rim, and an upright splash back panel terminating at its top and ends in a flanged rim continuous with said bowl panel flanged rim from a single metal blank; the steps of forming bowl and splash back panels flatwise in the blank with rim flanges extending downwardly therefrom, forming angularly arranged projecting portions integrally in said rim flanges, said portions intersecting along a bending line adjacent to the places where corners between the bowl and splash back panel rims occur in the completed sink, and moving said splash back panel to an upright position about said bending line to align said projecting portions and moving said aligned projecting portions about their intersections with said rim flanges to positions coplanar with the bowl and splash back panel flanges by bending operations.

10. In a method of making a sheet metal sink having a generally horizontal bowl panel terminating in a depending flange and an upright splash back panel terminating in a rearwardly projected flange continuous with said depending flange from a single metal blank, the steps of forming said bowl and splash back panels with a surrounding depending continuous flange in a flat metal blank, forming intersecting wings projecting from said flange in opposite sides of said blank, bending the splash back panel upwardly along a line passing through the wing intersections to re-form said wings into flat ears, and bending said ears about their intersections with said flange to positions coplanar with the bowl and splash back panel flanges.

11. The method of making a sink from a single metal blank, which includes drawing a bowl in the blank with adjacent areas for forming drain board, ledge, splash back and flanged rim portions; drawing drain board, ledge and splash back portions in said areas with a surrounding raised turned rim formed as a part of a depending flange; forming intersecting projecting portions integrally in said depending flange adjacent to the places in the rim where corners occur therein in the completed sink when the splash back is bent upwardly; trimming excess metal from the edge of the depending flange and from parts of said projecting portions; bending the splash back and its flanged rim portions to an upright position substantially at right angles to the generally horizontally extending bowl, drain board, ledge and flanged rim portions on a line passing through the intersections of said projecting portions thereby forming said projecting portions into flat ears; and bending said ears about their intersections with said depending flange to positions coplanar with the bowl and splash back rim flanges.

12. The method of making a corner in a sheet metal sink having bowl and splash back panels disposed substantially at right angles to each other and each terminating in a raised flanged rim, which includes forming said flanged panel rims continuously flatwise in a single metal blank in the region where the corner occurs in the finished sink, forming two projecting intersecting wings in the rim flange adjacent to the place where the corner bend in the rim occurs in the finished sink, and moving the splash back panel rim and its wing to an upright position to re-form said wings into a flat ear, and moving said flat ear about its intersection with said flanged rim to a position coplanar with the bowl and splash back rim flanges by bending operations to form the corner.

13. In a method of making a sheet metal sink having a generally horizontal panel containing a substantially rectangular bowl terminating in a turned rim having a depending flange and an upright splash back having a rearwardly projected flange merging with said depending flange from a single metal blank, the steps of forming a bowl panel having a substantially rectangular bowl and a splash back panel in a blank, forming a turned rim having a depending flange surrounding said panels, drawing projections having intersecting wings in the blank extending outwardly from said depending flange at opposite sides of said panels, and bending the splash back panel upwardly along a line passing through the plane of the turned rim and passing through said wing intersections and lying back of the plane of the rear bowl wall.

JACQUES STANITZ.